(12) United States Patent
Townsend et al.

(10) Patent No.: US 7,920,092 B2
(45) Date of Patent: Apr. 5, 2011

(54) GPS RECEIVER AND RELATED METHOD AND APPARATUS

(75) Inventors: Stephen Townsend, East Grinstead (GB); Andrew T. Yule, East Grinstead (GB); Saul R. Dooley, Horley (GB)

(73) Assignee: U-Blox AG, Thalwil (CH)

( * ) Notice: Subject to any disclaimer, the term of this patent is extended or adjusted under 35 U.S.C. 154(b) by 180 days.

(21) Appl. No.: 10/578,933

(22) PCT Filed: Nov. 3, 2004

(86) PCT No.: PCT/IB2004/052288
§ 371 (c)(1),
(2), (4) Date: May 8, 2006

(87) PCT Pub. No.: WO2005/045458
PCT Pub. Date: May 19, 2005

(65) Prior Publication Data
US 2007/0126625 A1 Jun. 7, 2007

(30) Foreign Application Priority Data
Nov. 8, 2003 (GB) .................................. 0326095.7

(51) Int. Cl.
*G01S 19/35* (2010.01)
(52) U.S. Cl. .................................................. 342/357.75
(58) Field of Classification Search . 342/357.01–357.78
See application file for complete search history.

(56) References Cited

U.S. PATENT DOCUMENTS

| 5,379,224 | A | * | 1/1995 | Brown et al. ................. 701/215 |
| 5,861,841 | A | | 1/1999 | Gildea et al. |
| 5,864,751 | A | | 1/1999 | Kazami et al. |
| 6,018,784 | A | | 1/2000 | Gildea et al. |
| 6,114,975 | A | * | 9/2000 | Guillard ........................ 340/945 |
| 6,389,359 | B1 | | 5/2002 | Potter et al. |
| 6,449,485 | B1 | | 9/2002 | Anzil |
| 6,667,713 | B2 | * | 12/2003 | Green et al. ............. 342/357.02 |
| 2007/0230545 | A1 | * | 10/2007 | Lennen ......................... 375/149 |

OTHER PUBLICATIONS

Akos et al. :"Real-Time Software Radio Architectures of GPS Receivers"; GPS World, Jul. 2001.

* cited by examiner

*Primary Examiner* — Thomas H Tarcza
*Assistant Examiner* — Nga X Nguyen
(74) *Attorney, Agent, or Firm* — Blakely, Sokoloff, Taylor & Zafman LLP

(57) ABSTRACT

A GPS receiver (10) is disclosed comprising a GPS antenna and a GPS RF front-end including an analogue to digital converter for sampling received GPS signals; and a processor for outputting, including to an external device, the GPS signal samples together with ancillary information either directly or indirectly describing characteristics of the GPS signal samples and/or the GPS signals contained therein. Also disclosed is a corresponding method of providing a position fix and a computer program, computer-readable storage medium and apparatus for the same.

20 Claims, 2 Drawing Sheets

GPS RECEIVER AND RELATED METHOD AND APPARATUS

The present invention relates to a GPS receiver comprising a GPS antenna and a GPS RF front-end including an analogue to digital converter for sampling received GPS signals; and a processor for outputting the GPS signal samples.

The present invention further relates to a corresponding method of providing a position fix comprising the steps of receiving from a GPS receiver GPS signal samples and processing the GPS signal samples to determine a position fix; and to a computer program, computer-readable storage medium and apparatus for the same.

Article "Real-time software radio architectures for GPS receivers" by Akos et al. (GPS World, July 2001) discloses "software GPS" in which much GPS signal processing is accomplished by means of a programmable micro-processor or digital signal processor as opposed to analogue or discrete hardwires components. As illustrated in FIG. 2 of this article, a simplified GPS receiver is provided consisting of a GPS antenna and GPS RF front-end for GPS signal pre-processing (including filtering, amplification and frequency down-conversion) and analogue to digital conversion. GPS signal samples outputted from the GPS receiver are then fed in to a modem PC or laptop running appropriate GPS signal processing software for processing the GPS signals to determine a position fix. The authors of this article have contemplated the GPS receiver to be a "plug-in" module, i.e. a "dongle" type device, which because of its simple architecture could be manufactured cheaply, thereby facilitating widespread adoption. And, of course, the GPS signal processing software which resides on the PC is inherently cheap to replicate.

Whatever specific GPS receiver architecture and GPS signal processing software configuration are adopted, it would be of course be expected that the output of the GPS receiver is compatible with the GPS signal processing software. In other words, since the attributes of the interface between the GPS receiver and GPS signal processing software are known, one or both would be designed with the other in mind. For example, the GPS signal processing software might have been configured to handle GPS signal samples of format, rate and resolution outputted by the GPS receiver.

In accordance with the present invention, there is provided a GPS receiver of the aforementioned type in which the processor outputs (especially to an external device) the GPS signal samples together with ancillary information either directly or indirectly describing characteristics of the GPS signal samples and/or the GPS signals contained therein.

Also provided in accordance with the present invention is a method of providing a position fix comprising the steps of: receiving from a GPS receiver GPS signal samples together with ancillary information describing characteristics of the GPS signal samples and/or the GPS signals contained therein and processing the GPS signal samples using the ancillary information to determine a position fix; and a computer program, computer-readable storage medium and apparatus for the same.

The inventors have realised that future software GPS systems may not necessarily have their GPS receivers (i.e. the GPS antenna and GPS RF front-end portion) and their GPS signal processing software designed with each other in mind. The present invention provides a mechanism by which GPS signal processing software receiving the ancillary information can establish and then adapt to the characteristics of a particular GPS receiver's output. This enables particular GPS signal processing software to process signals outputted from a variety of GPS receivers, and which may even have been designed and/or manufactured by different companies.

The present invention will now be described, by way of example only, with reference to the accompanying figures, in which.

Figure 1:
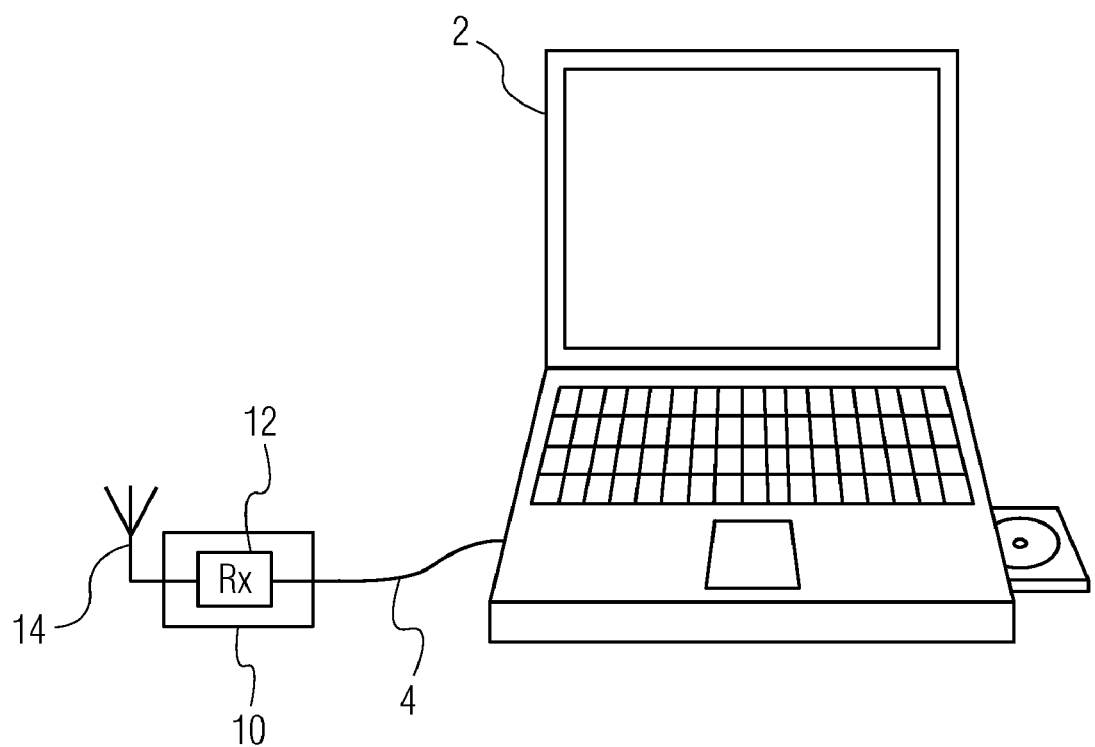
FIG. 1 shows, schematically, a laptop PC connected to a GPS receiver, both operating in accordance with the present invention.
Figure 2:
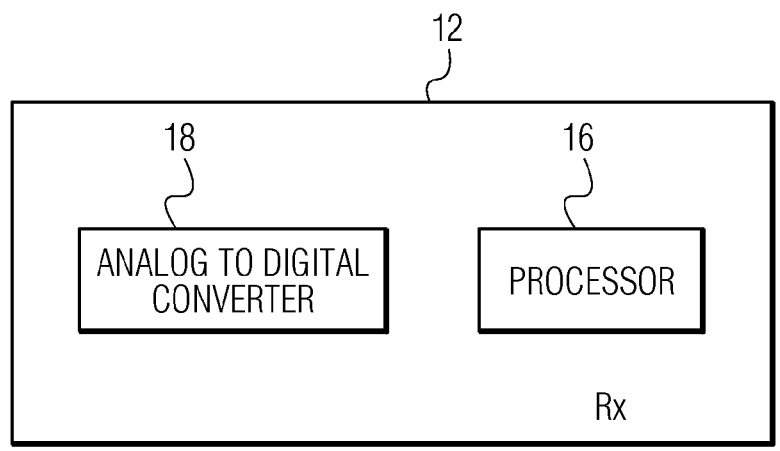
FIG. 2 is a block diagram of a GPS receiver, operating in accordance with the present invention.

Referring to the accompanying FIG. 1, the laptop PC is connected via a USB PC port and corresponding cable to the GPS receiver 10 which consists of a GPS RF front-end Rx and a GPS antenna, as shown in FIG. 2. Whilst the GPS receiver could have been a "dongle" type device thereby omitting the cable, the cable facilitates positioning of the GPS receiver (including the antenna) in a prominent position, thereby increasing the chances of acquiring GPS signals.

Referring to the accompanying figure, the laptop PC is connected via a USB PC port and corresponding cable to the GPS receiver 10 which consists of a GPS RF front-end Rx and a GPS antenna. Whilst the GPS receiver could have been a "dongle" type device thereby omitting the cable, the cable facilitates positioning of the GPS receiver (including the antenna) in a prominent position, thereby increasing the chances of acquiring GPS signals. For example, one might place the GPS receiver near a window if operating in doors.

FIG. 2 depicts an embodiment of the GPS RF front-end Rx 12 from FIG. 1 that includes a processor 16 and an analog-to-digital converter 18. When operative, the GPS receiver receives NAVSTAR SPS GPS signals through its antenna and pre-processes them, typically by passive bandpass filtering in order to minimise out-of-band RF interference, preamplification, down conversion to an intermediate frequency (IF) and analogue to digital conversion. The resultant GPS signal samples contain the IF signal which remains modulated, still containing all the information from the available satellites.

In accordance with the present invention, the GPS signal samples are outputted from the GPS receiver via the USB link into PC memory (not shown) with ancillary information describing characteristics of the GPS signal samples and/or the GPS signals contained therein.

Using laptop PC based GPS signal processing software and the ancillary information, the GPS signal samples are then processed so that GPS signals may acquired for the purpose of deriving pseudorange information from which the position of the PC can be determined using conventional navigation algorithms. Such GPS signal acquisition and pseudorange processing is well known, for example, see GPS Principles and Applications (Editor, Kaplan) ISBN 0-89006-793-7 Artech House.

The ancillary information may include the following:

Information Relating to the GPS Receiver Itself:

type and/or identity of the GPS receiver. If the GPS signal processing software can access a database mapping the type and/or identity of a GPS receiver to characteristics of GPS signal samples outputted that particular GPS receiver and/or the GPS signals that particular GPS receiver is used to receive, then the type and/or identity of the GPS receiver can be indirectly used by such GPS signal processing software to process the GPS signal samples.

Information Relating to the GPS Signal Received by the GPS Receiver:
  type and/or identity of the received GPS signal. A particular GPS receiver may be designed to receive different GPS signals and/or operate in one or a plurality of operating modes as, for example, directly selected by a user using user input means of the GPS receiver.
  received GPS signal(s) format
  received GPS signal(s) centre frequency
  received GPS signal(s) bandwidth Information Relating to the GPS Samples Outputted by the GPS Receiver:
  outputted GPS signal carrier frequency. The received GPS signal will typically be down converted to an intermediate frequency (IF) by the GPS receiver.
  outputted GPS signal bandwidth. This ought to corresponding to filtering done by the GPS receiver.
  outputted GPS signal sample format
  outputted GPS signal sample rate
  outputted GPS signal sample resolution
  image sign; that is, whether an increase in the frequency of the received GPS signal results in either an increase or decrease in the outputted GPS signal sample carrier frequency
  oscillator type and/or oscillator stability parameters; for example, whether the GPS receiver's oscillator has temperature compensation and if it does, accuracy parameters, and if not, error parameters.
  antenna type; for example, indicating the effective beam pattern.

Where appropriate, the ancillary information may also include information relating to the accuracy of any of the above.

It is likely there will be a requirement for at least some initialisation between the laptop PC and the GPS receiver, for example, triggered by the laptop's operating system detecting the presence of the GPS receiver. This may include an exchange of ancillary information prior to streaming GPS signal samples in to the laptop PC so enable the GPS software to correctly receive the data and to allow the GPS signal processing software to select a preferred configuration.

Whilst the present invention has been illustrated in the context of a laptop PC, it is of course equally applicable to other apparatus able to support GPS signal processing software and to which a GPS receiver according to the present invention can be connected. For example, the invention may be employed with mobile devices such as PDAs and telephone; or generally stationary objects such as a TVs or TV set-top boxes.

Also, whilst the connection between the GPS receiver and the GPS signal processing software is entirely wired in the above example, it could conceivable involve a wireless link.

Figure 3:
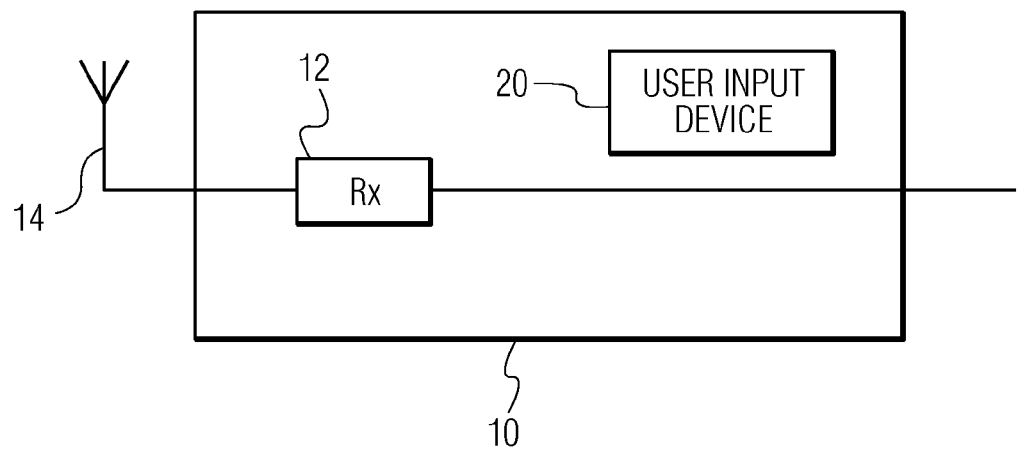
FIG. 3 is a block diagram of a GPS receiver including a user input device.

Furthermore, the GPS receiver shown in FIG. 1 may be provided with user input means with which a user may directly select one of a plurality of operating modes. FIG. 3 depicts an embodiment of the GPS receiver 10 from FIG. 1 that includes a user input device 20. For example, the user may change something relating to the GPS signal received by the GPS receiver such as at what centre frequency the GPS receiver is expecting to receive GPS signals should there be more than one possible frequency for target signals. In an alternative example, the user may change something relating to the GPS samples outputted by the GPS receiver such as at what sample rate or resolution the GPS signal samples are outputted.

As stated above, information relating to the GPS receiver's oscillator may be outputted by the GPS receiver to assist the laptop PC based GPS signal processing software. Oscillators generally have a stated operating frequency range corresponding to manufacturing tolerances, but it likely that the actual operating frequency which falls within this range is very stable, If such an oscillator in the GPS receiver is individually calibrated, this calibration information or a derivative thereof (e.g. the subsequent change in GPS signal sample output frequency) can be provided to the GPS signal processing software. The GPS signal processing software can actually perform the calibration itself by analysing the GPS receivers measurement of the frequency of received GPS signals. Once a position fix has been determined, the frequency of the received GPS signals can be determined authoritatively and hence the GPS receivers measurement error quantified. This error may then be uploaded to the GPS receiver and stored in say a flash memory so that subsequently, the GPS receiver can output this calibration information to assist GPS signal processing software performing a position fix.

Finally, whilst the invention has been described in the context of NAVSTAR GPS, the all weather, spaced based navigation system developed and currently operated by the US Department of Defense, it will be appreciated that the invention is equally applicable to other global positioning systems including GLONASS and Galileo and hybrids thereof.

The invention claimed is:

1. A GPS receiver comprising a GPS antenna and a GPS RF front-end including an analogue to digital converter for sampling received GPS signals wherein the resulting GPS signal samples contain an intermediate frequency (IF) signal which remains modulated; and a processor for outputting the GPS signal samples together with ancillary information either directly or indirectly describing characteristics of the GPS signal samples and/or the GPS signals which relate to the GPS receiver, wherein the ancillary information allows GPS signal processing software to adapt to characteristics of the GPS receiver.

2. A GPS receiver according to claim 1 wherein the GPS signal samples and ancillary information are outputted to an external device.

3. A GPS receiver according to claim 1 wherein the ancillary information includes information relating to the type or identity of the GPS receiver.

4. A GPS receiver according to claim 1 wherein the ancillary information includes information relating to the GPS signal received by the GPS receiver.

5. A GPS receiver according to claim 4 wherein the ancillary information includes either the type or identity of the received GPS signal, or the received GPS signal(s) format, center frequency or bandwidth.

6. A GPS receiver according to claim 1 wherein the ancillary information includes information relating to the GPS samples outputted by the GPS receiver.

7. A GPS receiver according to claim 6 wherein the ancillary information includes either the outputted GPS signal carrier frequency or bandwidth, the GPS signal sample format, rate or resolution, the image sign, the oscillator type or oscillator stability parameters, or the antenna type.

8. A GPS receiver according to claim 1 further comprising user input means with which the user is able to directly select one of a plurality of operating modes of the GPS receiver.

9. A method of providing a position fix comprising the steps of:
  receiving from a GPS receiver GPS signal samples of a GPS signal, the samples containing an intermediate frequency (IF) signal which remains modulated, and being received together with ancillary information describing characteristics of the GPS signal samples and/or the GPS signals which relate to the GPS receiver, wherein the ancillary information allows GPS signal processing software to adapt to characteristics of the GPS receiver; and processing the CPS signal samples using the ancillary information to determine a position fix.

10. A method according to claim 9 wherein the GPS signal is a spread spectrum signal; and wherein the ancillary information is used to assist despreading of the GPS spread spectrum signal.

11. A method according to claim 9 wherein the GPS signal samples and ancillary information are received from an external device.

12. A method according to claim 9 wherein the ancillary information includes information relating to the type or identity of the GPS receiver.

13. A method according to claim 9 wherein the ancillary information includes information relating to the GPS signal received by the GPS receiver.

14. A method according to claim 13 wherein the ancillary information includes either the type or identity of the received GPS signal, or the received GPS signal(s) format, center frequency or bandwidth.

15. A method according to claim 9 wherein the ancillary information includes information relating to the GPS samples outputted by the GPS receiver.

16. A method according to claim 15 wherein the ancillary information includes either the outputted GPS signal carrier frequency or bandwidth, the GPS signal sample format, rate or resolution, the image sign, the oscillator type or oscillator stability parameters, or the antenna type.

17. A computer program comprising instructions for performing a method according to claim 9.

18. A computer-readable storage medium having recorded thereon data containing instructions for performing a method according to claim 9.

19. Apparatus configured to perform a method according to claim 9.

20. Apparatus configured to connect to a GPS, receiver of the type claimed in claim 1.

* * * * *